`United States Patent` [19]

Möller et al.

[11] Patent Number: 6,159,556
[45] Date of Patent: Dec. 12, 2000

[54] PROCESS FOR PREPARING AN AQUEOUS POWDER COATING DISPERSION AND USING THE SAME

[75] Inventors: Dietmar Möller; Joachim Woltering, both of Münster, Germany

[73] Assignee: BASF Coatings AG, Muenster-Hiltrup, Germany

[21] Appl. No.: 08/952,567

[22] PCT Filed: May 9, 1996

[86] PCT No.: PCT/EP96/01959

§ 371 Date: Feb. 6, 1998

§ 102(e) Date: Feb. 6, 1998

[87] PCT Pub. No.: WO96/37561

PCT Pub. Date: Nov. 28, 1996

[30] Foreign Application Priority Data

May 19, 1995 [DE] Germany .................. 195 18 392

[51] Int. Cl.$^7$ .................................................. B05D 1/04
[52] U.S. Cl. .................. 427/475; 427/485; 523/403; 525/408; 525/411
[58] Field of Search .................. 427/475, 485, 427/486, 421; 523/403; 525/408, 411

[56] References Cited

U.S. PATENT DOCUMENTS

| | | |
|---|---|---|
| 3,781,379 | 12/1973 | Theodoe et al. . |
| 3,907,737 | 9/1975 | Marx et al. . |
| 4,091,048 | 5/1978 | Labana et al. .................. 260/836 |
| 4,100,315 | 7/1978 | Lauterbach .................. 427/379 |
| 4,137,349 | 1/1979 | Sakakibara et al. . |
| 4,155,892 | 5/1979 | Emmons et al. .................. 260/29.2 |
| 4,181,642 | 1/1980 | Holle et al. . |
| 4,268,542 | 5/1981 | Sakaklbars et al. . |
| 4,312,795 | 1/1982 | Taguchi et al. . |
| 4,346,144 | 8/1982 | Craven . |
| 5,055,524 | 10/1991 | Pettit, Jr. et al. . |
| 5,270,416 | 12/1993 | Toman et al. . |
| 5,378,756 | 1/1995 | Thies et al. . |
| 5,612,397 | 3/1997 | Gebhard et al. . |

FOREIGN PATENT DOCUMENTS 1 338 204  3/1972  United Kingdom .

OTHER PUBLICATIONS

Webster's Ninth New Collegiate Dictionary, A Merriam–Wester,cover page, & p. 365 Undated.
Chemical Dictionary Fifth Edition, Grant & Hach's, Roger Grant & Claire Grant, cover page & p. 192 Undated.
Paints, Coating and Solvents, Second, Completely Revised edition, Dieter Stoye, Werner Freitag (Editors), cover page, and pp. 37–38 Undated.

*Primary Examiner*—Fred J. Parker

[57] ABSTRACT

The present invention relates to an aqueous powder coating dispersion comprising a solid, pulverulent component A and an aqueous component B, in which component A. is a powder coating comprising
a) at least one epoxide-containing binder with a content of from 30 to 45%, preferably from 30 to 35%, of glycidyl-containing monomers and, if desired, with a content of aromatic vinyl compounds, preferably styrene,
b) at least one crosslinking agent, preferably straight-chain aliphatic dicarboxylic acids and/or carboxy-functional polyesters, and
c) if desired, catalysts, auxiliaries, typical powder coating additives, such as degassing agents, levelling agents, UV absorbers, free-radical scavengers and antioxidants,
and component B. is an aqueous dispersion comprising
a) at least one nonionic thickener and
b) if desired, catalysts, auxiliaries, defoaming agents, dispersion auxiliaries, wetting agents, preferably carboxy-functional dispersants, antioxidants, UV absorbers, free-radical scavengers, biocides, small quantities of solvent and/or hygroscopic agents.

23 Claims, 1 Drawing Sheet

PROCESS FOR PREPARING AN AQUEOUS POWDER COATING DISPERSION AND USING THE SAME

The application also relates to a process for the preparation of the powder coating dispersion and to its use for car bodies.

BACKGROUND OF THE INVENTION

The present invention relates to an aqueous powder coating dispersion which is particularly suitable as a coating for car bodies which have been coated with aqueous basecoat.

For the coating of car bodies, preference is currently given to the use of liquid coating materials. These cause numerous environmental problems owing to their solvent content. The same applies to cases where water-based coating materials are employed.

For this reason, increased efforts have been made in recent years to use powder coatings for the coating operation. The results so far, however, are not satisfactory; in particular, increased coat thicknesses are necessary in order to achieve a uniform appearance. On the other hand, the use of pulverulent coating materials entails a different application technology. Plants designed for liquid coating materials, therefore, cannot be used for the powders. The aim is therefore to develop powder coatings in the form of aqueous dispersions which can be processed with liquid coating technologies.

U.S. Pat. No. 4,268,542, for example, discloses a process in which a powder coating slurry is used which is suitable for the coating of cars. In this process, a conventional powder coat is first applied to the body, and the clearcoat slurry is applied as second coat. In this clearcoat slurry, which is based on acrylate resins, ionic thickeners are used. Furthermore, in one of the examples these thickeners contain from 0.5 to 30% of glycidyl-containing monomers. Moreover, high stoving temperatures (above 160° C.) are necessary.

The present invention has now set itself the object of providing an aqueous powder coating dispersion which can be applied to car bodies by the existing liquid coating technology and which, in particular, can be stoved even at temperatures of 130° C.

SUMMARY OF THE INVENTION

This object is achieved in that the aqueous powder coating dispersion can be prepared by subjecting an aqueous dispersion of a powder coating having a glass transition temperature of from 20 to 90° C., preferably from 40 to 70° C., a viscosity of from 10 to 1000 mPas, preferably from 50 to 300 mPas, at a shear rate of 500 $s^{-1}$ and a solids content of from 10 to 50%, preferably from 20 to 40% by weight, to a grinding process while maintaining a temperature of from 0 to 60° C., preferably from 5 to 35° C. The specific energy input during the grinding process is preferably from 20 to 500 Wh/kg, in particular from 50 to 250 Wh/kg.

DETAILED DESCRIPTION OF THE INVENTION

Figure 1:
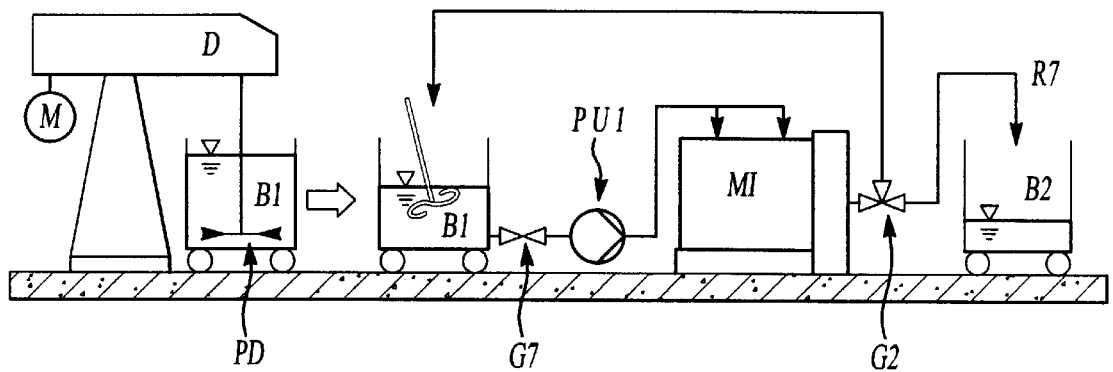
FIGS. 1 and 2 provide an illustration of a grinding process for use in preparing the instant invention.

An aqueous powder coating dispersion employed in accordance with the invention comprises a solid, pulverulent component A and an aqueous component B, in which component A. is a powder coating comprising a) at least one epoxide-containing binder with a content of from 30 to 45% by weight, preferably from 30 to 35%, of glycidyl-containing monomers and, if desired, with a content of aromatic vinyl compounds, preferably styrene, b) at least one crosslinking agent, preferably straight-chain aliphatic dicarboxylic acids and/or carboxy-functional polyesters, and c) if desired, catalysts, auxiliaries, typical powder coating additives, such as degassing agents, levelling agents, UV absorbers, free-radical scavengers and antioxidants, and component B. is an aqueous dispersion comprising a) at least one nonionic thickener and b) if desired, catalysts, auxiliaries, defoaming agents, dispersion auxiliaries, wetting agents, preferably carboxy-functional dispersants, antioxidants, UV absorbers, free-radical scavengers, small quantities of solvent, antioxidants, UV absorbers, free-radical scavengers, small quantities of solvent, levelling agents, biocides and/or hygroscopic agents.

Dispersions with such a composition are used in particular for powder clearcoats.

Suitable epoxy-functional binders for the solid powder coating used to prepare the dispersion are, for example, polyacrylate resins which contain epoxy groups and which can be prepared by copolymerization of at least one ethylenically unsaturated monomer containing at least one epoxide group in the molecule with at least one other ethylenically unsaturated monomer containing no epoxide group in the molecule, at least one of the monomers being an ester of acrylic acid or methacrylic acid. Epoxide group-containing polyacrylate resins of this kind are known, for example, from EP-A-299 420, DE-B-22 14 650, DE-B-27 49 576, U.S. Pat. No. 4,091,048 and U.S. Pat. No. 3,781, 379).

Examples of ethylenically unsaturated monomers containing no epoxide group in the molecule are alkyl esters of acrylic and methacrylic acid containing 1 to 20 carbon atoms in the alkyl radical, especially methyl acrylate, methyl methacrylate, ethyl acrylate, ethyl methacrylate, butyl acrylate, butyl methacrylate, 2-ethylhexyl acrylate and 2-ethylhexyl methacrylate. Other examples of ethylenically unsaturated monomers containing no epoxide groups in the molecule are acid amides, for example acrylamide and methacrylamide, aromatic vinyl compounds, such as styrene, methylstyrene and vinyltoluene, nitriles, such as acrylonitrile and methacrylonitrile, vinyl halides and vinylidene halides, such as vinyl chloride and vinylidene fluoride, vinyl esters, for example vinyl acetate, and hydroxyl-containing monomers, for example hydroxyethyl acrylate and hydroxyethyl methacrylate.

The polyacrylate resin containing epoxide groups usually has an epoxide equivalent weight of from 400 to 2500, preferably from 420 to 700, a number-average molecular weight (determined by gel permeation chromatography using a polystyrene standard) of from 2000 to 20,000, preferably from 3000 to 10,000, and a glass transition temperature ($T_G$) of from 30 to 80° C., preferably from 40 to 70° C., particularly preferably from 40 to 60° C. (measured by means of Differential Scanning Calorimetry (DSC)). A temperature of about 50° C. is very particularly preferred. It is also possible to employ mixtures of two or more acrylate resins.

The polyacrylate resin containing epoxide groups can be prepared in accordance with generally well-known methods by polymerization.

Suitable crosslinking agents are carboxylic acids, especially saturated, straight-chain aliphatic dicarboxylic acids having 3 to 20 carbon atoms in the molecule. Very particular preference is given to the use of decane-1,12-dicarboxylic acid. To modify the properties of the finished powder clearcoats it is also possible, if desired, to employ other carboxyl-containing crosslinking agents. Examples hereof which may be mentioned are saturated branched or unsaturated straight-chain di- and polycarboxylic acids, and also polymers containing carboxyl groups.

Also suitable are powder coatings comprising an epoxy-functional crosslinking agent and an acid-functional binder.

Examples of suitable acid-functional binders are acidic polyacrylate resins which can be prepared by copolymerizing at least one ethylenically unsaturated monomer containing at least one acid group in the molecule with at least one other ethylenically unsaturated monomer containing no acid group in the molecule.

The binder containing epoxide groups or the crosslinking agent containing epoxide groups and the carboxyl or, respectively, the binder are usually employed in a quantity such that there are from 0.5 to 1.5, preferably from 0.75 to 1.25, equivalents of carboxyl groups per equivalent of epoxide groups. The quantity of carboxyl groups present can be determined by titration with an alcoholic KOH solution.

In accordance with the invention the binder comprises aromatic vinyl compounds, especially styrene. In order to limit the danger of cracking, however, the content is not more than 35% by weight. From 10 to 25% by weight is preferred.

The solid powder coatings comprise, if desired, one or more suitable catalysts for the epoxy resin curing. Suitable catalysts are phosphonium salts of organic or inorganic acids, quaternary ammonium compounds, amines, imidazole and imidazole derivatives. The catalysts are in general employed in proportions of from 0.001% by weight to about 2% by weight, based on the overall weight of the epoxy resin and of the crosslinking agent.

Examples of suitable phosphonium catalysts are ethyl triphenylphosphonium iodide, ethyltriphenylphosphonium chloride, ethyltriphenylphosphonium thiocyanate, ethyltriphenylphosphonium acetate/acetic acid complex, tetrabutylphosphonium iodide, tetrabutylphosphonium bromide and tetrabutylphosphonium acetate/acetic acid complex. These and other suitable phosphonium catalysts are described, for example, in U.S. Pat. No. 3,477,990 and U.S. Pat. No. 3,341,580.

Examples of suitable imidazole catalysts are 2-styrylimidazole, 1-benzyl-2-methylimidazole, 2-methylimidazole and 2-butylimidazole. These and other imidazole catalysts are described, for example, in Belgian Patent No. 756,693.

The solid powder coatings can additionally, if desired, comprise auxiliaries and additives as well. Examples of these are levelling agents, antioxidants, UV absorbers, free-radical scavengers, flow aids and degassing agents such as, for example, benzoin.

Suitable levelling agents are those based on polyacrylates, polysiloxanes and/or fluorine compounds.

Antioxidants which can be employed are reducing agents, such as hydrazides and phosphorus compounds, and also free-radical scavengers, for example 2,6 di-tert-buthylphenol derivatives.

UV absorbers which can be used are preferably triazines and benzotriphenol.

As free-radical scavengers which can be employed, preference is given to 2,2,6,6 tetramethylpiperidine derivatives.

As a further constituent the aqueous component B of the powder coating dispersion contains at least one nonionic thickener a). Preference is given to the use of nonionic associative thickeners a). Structural features of such associative thickeners a) are:

aa) a hydrophilic structure which ensures adequate solubility in water, and ab) hydrophobic groups which are capable of associative interaction in the aqueous medium.

Examples of hydrophobic groups employed are long-chain alkyl radicals, for example dodecyl, hexadecyl or octadecyl radicals, or alkaryl radicals, for example octylphenyl or nonylphenyl radicals.

Hydrophilic structures employed are preferably polyacrylates, cellulose ethers or, with particular preference, polyurethanes, which comprise the hydrophobic groups as polymer units.

As hydrophilic structures, very particular preference is given to the use of polyurethanes comprising polyether chains as structural units, preferably comprising polyethylene oxide. In the synthesis of such polyetherpolyurethanes, the di- and/or polyisocyanates, preferably aliphatic diisocyanates, particularly preferably unsubstituted or alkyl-substituted 1,6-hexamethylene diisocyanate, serve for the linking of the hydroxyl-terminated polyether units with one another and for the linking of the polyether units with the hydrophobic end group units, which may for example be monofunctional alcohols and/or amines having the long-chain alkyl radicals or aralkyl radicals already mentioned.

Component B can additionally comprise catalysts, levelling agents, antioxidants, UV absorbers, free-radical scavengers and wetting agents. Suitable substances in this context are essentially those already listed for component A.

Further agents which can be added to component B are auxiliaries, defoaming agents, dispersion auxiliaries, biocides, solvents and neutralizing agents.

Suitable defoaming agents are preferably modified polysiloxanes.

Preferred examples of dispersion auxiliaries are ammonium or metal salts of polycarboxylates.

Neutralizing agents which can be used are amines, ammonia and metal hydroxides.

The solid powder coatings are prepared by known methods (cf. e.g. product information sheet "Pulverlacke" [Powder coatings] from BASF Lacke +Farben AG, 1990) by homogenization and dispersion, for example by means of an extruder, screw-type compounding unit, and the like. After the powder coatings have been prepared, they are prepared for dispersion by grinding and, if appropriate, by classifying and screening.

The aqueous powder clearcoat dispersion can subsequently be prepared from the dry-ground powder coating by wet grinding or by introduction with stirring. Wet grinding is particularly preferred.

Accordingly, the present invention also relates to a process for the preparation of an aqueous powder coating dispersion, in the course of which this dispersion of a powder coating having a glass transition temperature of from 20 to 90° C., preferably from 40 to 70° C., and a viscosity of from 10 to 1000 mPas, preferably from 50 to 300 mPas, is prepared at a shear rate of 500 s$^{-1}$ and a solids content of from 10 to 50% by weight, preferably from 20 to 40%, this dispersion is ground while maintaining a temperature of from 0 to 60° C., preferably from 5 to 35° C., a pH of from 4.0 to 7.0, preferably from 5.5 to 6.5, is established and the dispersion is filtered.

The specific energy input during the grinding process is preferably from 20 to 500 Wh/kg.

In a preferred embodiment of the invention, the process for the preparation of an aqueous powder coating dispersion relies on the basis of the component A described, which in accordance with the invention is dispersed in a component B. The latter comprises an aqueous dispersion of at least one nonionic thickener and, if desired, of catalysts, auxiliaries, antifoam agents, antioxidants, wetting agents, UV absorbers, free-radical scavengers, biocides, hygroscopic agents, small quantities of solvents and/or dispersion auxiliaries, preferably carboxy-functional dispersion auxiliaries.

In accordance with the invention, grinding is carried out after the dispersion of component A in component B.

The aqueous powder coating dispersion may comprise a solvent content of from 0 to 10% by weight, based on the total weight of the aqueous powder coating dispersion.

The mean particle size obtained is between 1 and 25 μm, preferably below 20 μm. With particular preference it is from 3 to 10 μm.

It is an essential feature of the invention that during the grinding process the dispersion contains only small quantities of solvent. It may therefore be necessary under certain circumstances to free the grinding apparatus from solvent residues before beginning the grinding process.

Before or after wet grinding and/or the introduction of the dry powder coating into the water, it is possible for from 0 to 5% by weight of a defoamer mixture, an ammonium and/or alkali metal salt, a carboxyl-functional or nonionic dispersion auxiliary, a wetting agent and/or a thickener mixture, and the other additives, to be added to the dispersion.

In accordance with the invention, defoamers, dispersion auxiliaries, wetting agents and/or thickeners are first of all dispersed in water. Then small portions of the powder clearcoat are stirred in. Subsequently, defoamers, dispersion auxiliaries, thickeners and wetting agents are again incorporated by dispersion. Finally, powder clearcoats are again stirred in in small portions.

In accordance with the invention, the pH is preferably established using ammonia or amines. In this context the pH may initially rise, so that a strongly basic dispersion is produced. However, the pH falls back to the values indicated above within a period of several hours or days.

The powder coating dispersion according to the invention can be used in particular in the form of a clearcoat as a coating over basecoats, preferably in the automotive industry. Such a clearcoat dispersion is particularly suitable for aqueous basecoats based on a polyester, a polyurethane resin and an amino resin.

The powder coating dispersions according to the invention can be applied by methods known from liquid coating technology. They can in particular be applied by spray techniques. Also suitable are electrostatically assisted high-speed rotation or pneumatic application.

The powder clearcoat dispersions applied to the basecoat are in general flashed off before stoving. This is expediently carried out first at room temperature and then at slightly elevated temperature. In general the elevated temperature is from 40 to 70° C., preferably from 50 to 65° C. The flash-off time is from 2 to 10 minutes, preferably from 4 to 8 minutes at room temperature. At elevated temperature, flashing off is repeated for the same period of time.

Stoving can be carried out at temperatures from as low as 130° C. It is possible to carry out stoving at from 130 to 180° C., preferably from 135 to 155° C.

Using the process according to the invention it is possible to achieve coat thicknesses of from 30 to 50 μm, preferably from 35 to 45 μm. Clearcoats of comparable quality could hitherto, in accordance with the prior art, be achieved, with the use of powder clearcoats, only by applying coat thicknesses of from 65 to 80 μm.

Example of the production of a powder slurry

Figure 2:
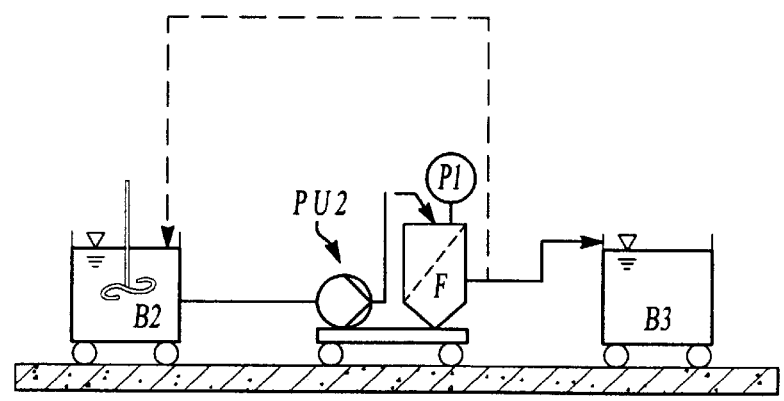

The equipment used to produce the powder slurry and the procedure are depicted diagrammatically in FIGS. 1 and 2.

The production process is as follows:

1. Weighing-in of the liquid components

Deionized water, thickeners, wetting agents and dispersants are introduced over a dissolver D containing a motor unit M in the container B1. After adding the powder to the liquids, the batch is subjected to the action of the dissolver for 20 minutes (peripheral disc PD speed 20 m/s).

2. Initial flushing of the stirred ball mill

Before the beginning of wet grinding, the mill MI is flushed with a mixture of deionized water and the additives contained in the product until the machine is free from other solvents.

3. Wet grinding

The product batch described in 1. is ground with the aid of a stirred ball mill MI. For this purpose the product is supplied to the mill MI through a gauge G1 by means of a pump PU1 and is circulated around the mill MI until the desired end quality ($x_{50}<4\mu$, $x_{max}<10\mu$) is reached with a specific energy input of about 60 Wh/kg. The three-way valve G2 is positioned accordingly. The maximum temperature reached is less than 25° C. Thereafter, the powder slurry is discharged by way of transfer means R1 into a vessel B2, the three-way valve G2 being positioned accordingly.

4. Completion of the powder slurry

After wet grinding, the powder slurry is made up. This is done by adding additional small quantities of additives (thickeners, wetting agents, amine) with stirring.

5. Filtration

Filtration is carried out as shown in FIG. 2. The powder slurry of B2 is initially filtered in circulation by way of pump PU2 with bag filters (PONG 50) in the filtration unit F comprising gauge P1. Filtration is subsequently carried out in one pass over the same bag filters in the filtration unit F into a clean container B3. The slurry is then dispensed into its final containers.

What is claimed is:

1. An aqueous powder coating dispersion, comprising the result of dispersing a solid pulverulent component A into an aqueous component B to provide an aqueous dispersion of a powder coating composition having a glass transition temperature of from 20 to 90° C., a viscosity of from 10 to 1000 mPas at a shear rate of 500 s$^{-1}$, and a solids content of from 20 to 40% by weight, subjecting said aqueous dispersion of a powder coating to a grinding process while maintaining a temperature of from 0 to 60° C. to provide an aqueous powder coating dispersion having a solids content of from 20 to 40% by weight, wherein solid pulverulent component A is a powder coating composition comprising a) at least one epoxide-containing binder comprising from 30 to 45% by weight of glycidyl-containing monomers, b) at least one crosslinking agent, and component B is an aqueous dispersion comprising a) at least one nonionic thickener.

2. The aqueous powder coating dispersion of claim 1, wherein the grinding process has a specific energy input between 20 and 500 Wh/kg.

3. An aqueous powder coating dispersion comprising incorporating a first portion of the ground aqueous dispersion of a powder coating of claim 1 into an aqueous dispersion comprising one or more additives selected from the group consisting of defoamers, dispersion auxiliaries, wetting agents, thickeners, and mixtures thereof, to create an aqueous dispersion containing the first portion of ground aqueous dispersion of a powder coating, incorporating one or more additional additives selected from the group consisting of defoamers, dispersion auxiliaries, wetting agents, thickeners, and mixtures thereof, into the aqueous dispersion containing the first portion of ground aqueous dispersion of a powder coating, and incorporating a second portion of the ground aqueous dispersion of a powder coating of claim 1 into the aqueous dispersion containing the first portion of ground aqueous dispersion of a powder coating and one or more additional additives to an aqueous dispersion of a powder coating.

4. The aqueous powder coating dispersion of claim 1 which is a powder clearcoat dispersion.

5. The aqueous powder coating dispersion of claim 1 having a pH between 4.0 and 7.0.

6. The aqueous powder coating dispersion of claim 1 wherein the epoxide-containing containing binder A a) further comprises aromatic vinyl compounds.

7. The aqueous powder coating dispersion of claim 1 wherein the epoxide-functional binders comprise polyacrylate resins which contain epoxy groups, and the glycidyl-containing monomers are selected from the group consisting of glycidyl acrylate, glycidyl methacrylate, allyl glycidyl esters and mixtures thereof.

8. The aqueous powder coating dispersion of claim 1 wherein nonionic thickener a) of component B comprises at least one nonionic associative thickener comprising:

aa) a hydrophilic structure and ab) hydrophobic groups capable of associative interaction in an aqueous medium.

9. The aqueous powder coating dispersion according to claim 8, wherein nonionic associative thickener a) comprises polyurethane chains as hydrophilic structure aa).

10. The aqueous powder coating dispersion according to claim 9, wherein nonionic associative thickener a) comprises polyurethane chains with polyether units as hydrophilic structure aa).

11. The aqueous powder coating dispersion of claim 1, having a particle size not more than 20 $\mu$m.

12. A process for the preparation of an aqueous powder coating dispersion comprising preparing an aqueous dispersion of a powder coating composition by dispersing a solid pulverulent component A into an aqueous component B, the resulting aqueous dispersion having a glass transition temperature of from 20 to 90° C., a viscosity of from 10 to 1000 mPas at a shear rate of 500 s$^{-1}$, and a solids content of from 20 to 40% by weight, and grinding the aqueous dispersion of a powder coating composition while maintaining a temperature of from 0 to 60° C. to provide a ground aqueous dispersion of a powder coating, establishing a pH of from 4.0 to 7.0 in the ground aqueous dispersion of a powder coating, and filtering the ground aqueous dispersion of a powder coating dispersion to provide an aqueous powder coating dispersion, wherein solid pulverulent component A is a powder coating composition comprising a) at least one epoxide-containing binder comprising from 30 to 45% by weight of glycidyl-containing monomers, b) at least one crosslinking agent selected from the group consisting of straight chain aliphatic dicarboxylic acids, carboxy-functional polyesters, and mixtures thereof, and component B is an aqueous dispersion comprising a) at least one nonionic thickener.

13. The process of claim 12, further comprising grinding the aqueous dispersion of a powder coating composition in a grinding apparatus.

14. The aqueous powder coating dispersion of claim 1 wherein the aqueous dispersion of a powder coating composition subjected to grinding has a glass transition temperature of from 40 to 70° C., a viscosity of from 50 to 300 mPas at a shear rate of 500 s$^{-1}$ and a solids content of from 20 to 40% by weight and the grinding process is maintained at a temperature of from 5 to 35° C.

15. The aqueous powder coating dispersion of claim 1, wherein the grinding process has a specific energy input between 50 to 250 Wh/kg.

16. The aqueous powder dispersion of claim 1 wherein epoxide containing binder Aa) comprises from 30 to 35% by weight of glycidyl-containing monomers.

17. The aqueous powder dispersion of claim 1 wherein crosslinking agent Ab) is selected from the group consisting of straight chain aliphatic dicarboxylic acids, carboxy functional polyesters, and mixtures thereof.

18. The aqueous powder dispersion of claim 5 having a pH between 5.5 and 6.5.

19. The aqueous powder coating dispersion of claim 6 wherein the epoxide containing binder Aa) comprises no more than 35% by weight of aromatic vinyl compounds based on the weight of component Aa).

20. The aqueous powder coating dispersion of claim 19 wherein the epoxide containing binder Aa) comprises 10–25% by weight of aromatic vinyl compounds based on the weight of component Aa).

21. The aqueous powder coating dispersion of claim 6 wherein the epoxide containing binder Aa) further comprises styrene.

22. A process of coating an article with an aqueous dispersion of a powder coating composition, comprising providing an aqueous powder coating dispersion comprising the result of subjecting an aqueous dispersion of a powder coating composition comprising at least one crosslinking agent, the aqueous dispersion having a glass transition temperature of from 20 to 90° C., a viscosity of from 10 to 1000 mPas, and a solids content of from 20 to 40% by weight, to a grinding process while maintaining a temperature of from 0 to 60° C. , and applying the aqueous dispersion of a powder coating composition to an article by means of electrostatically assisted rotation or pneumatic application.

23. The process of claim 22 wherein the article is an automotive car body or a component thereof.

* * * * *